(12) United States Patent
Desai et al.

(10) Patent No.: US 11,204,783 B2
(45) Date of Patent: Dec. 21, 2021

(54) METHOD AND DEVICE FOR PROCESS DATA SHARING

(71) Applicant: Apple Inc., Cupertino, CA (US)

(72) Inventors: Ranjit Desai, Cupertino, CA (US); Michael J. Rockwell, Palo Alto, CA (US); Venu Madhav Duggineni, Santa Clara, CA (US); Robert Seon Wai Lee, San Jose, CA (US)

(73) Assignee: APPLE INC., Cupertino, CA (US)

( * ) Notice: Subject to any disclaimer, the term of this patent is extended or adjusted under 35 U.S.C. 154(b) by 38 days.

(21) Appl. No.: 16/548,065

(22) Filed: Aug. 22, 2019

(65) Prior Publication Data

US 2020/0065571 A1  Feb. 27, 2020

Related U.S. Application Data

(60) Provisional application No. 62/721,685, filed on Aug. 23, 2018.

(51) Int. Cl.
*G06F 9/451* (2018.01)
*G06K 9/00* (2006.01)
*G06F 3/01* (2006.01)

(52) U.S. Cl.
CPC .............. *G06F 9/451* (2018.02); *G06F 3/011* (2013.01); *G06F 3/013* (2013.01); *G06K 9/00255* (2013.01); *G06K 9/00342* (2013.01)

(58) Field of Classification Search
CPC .......... G06F 9/451; G06F 3/011; G06F 3/013; G06K 9/00342; G06K 9/00255
See application file for complete search history.

(56) References Cited

U.S. PATENT DOCUMENTS

| | | | |
|---|---|---|---|
| 2003/0217246 A1* | 11/2003 | Kubota | G06F 1/3275 711/170 |
| 2012/0079494 A1* | 3/2012 | Sandstrom | G06F 9/4881 718/104 |
| 2015/0310665 A1* | 10/2015 | Michail | G02B 27/0179 345/419 |

* cited by examiner

*Primary Examiner* — Casey L Kretzer
(74) *Attorney, Agent, or Firm* — Fernando & Partners, LLP

(57) ABSTRACT

In one implementation, a method of accessing shared data among processes is performed by a device including processor(s), non-transitory memory, and an image acquisition interface. The method includes obtaining image data acquired by the image acquisition interface. The method further includes determining pose data based at least in part on inertial measurement unit (IMU) information measured by the image acquisition interface. The method also includes determining a gaze estimation based at least in part on eye tracking information obtained through the image acquisition interface. Based at least in part on characteristics of processes, the method includes determining an arrangement for the image data, the pose data, and the gaze estimation. The method additionally includes determining an access schedule for the processes based at least in part on at least one of: the arrangement, the characteristics of the processes, and hardware timing parameters associated with the device.

30 Claims, 10 Drawing Sheets

METHOD AND DEVICE FOR PROCESS DATA SHARING

TECHNICAL FIELD

The present disclosure generally relates to data sharing, and in particular, to systems, methods, and devices providing low-latency data sharing using a deterministic pull/fetch model.

BACKGROUND

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include smartphones, tablets, desktop/laptop computers, head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback and/or cameras having hand tracking and/or other body pose estimation abilities).

A head-mounted system may have one or more speaker(s) and an integrated opaque display. Alternatively, a head-mounted system may be a head-mounted enclosure (HME) configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Content available on CGR devices is becoming more immersive, more graphically intensive, and universally applicable to everyday lives. Thus, the hardware in CGR devices continues to evolve to accommodate resource-heavy processes in order to keep up with the CGR content. However, with multiple processes contending for resources at once, latency and a large number of interrupts naturally create a bottleneck effect. Visible latency issues can adversely affect a user's experience.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
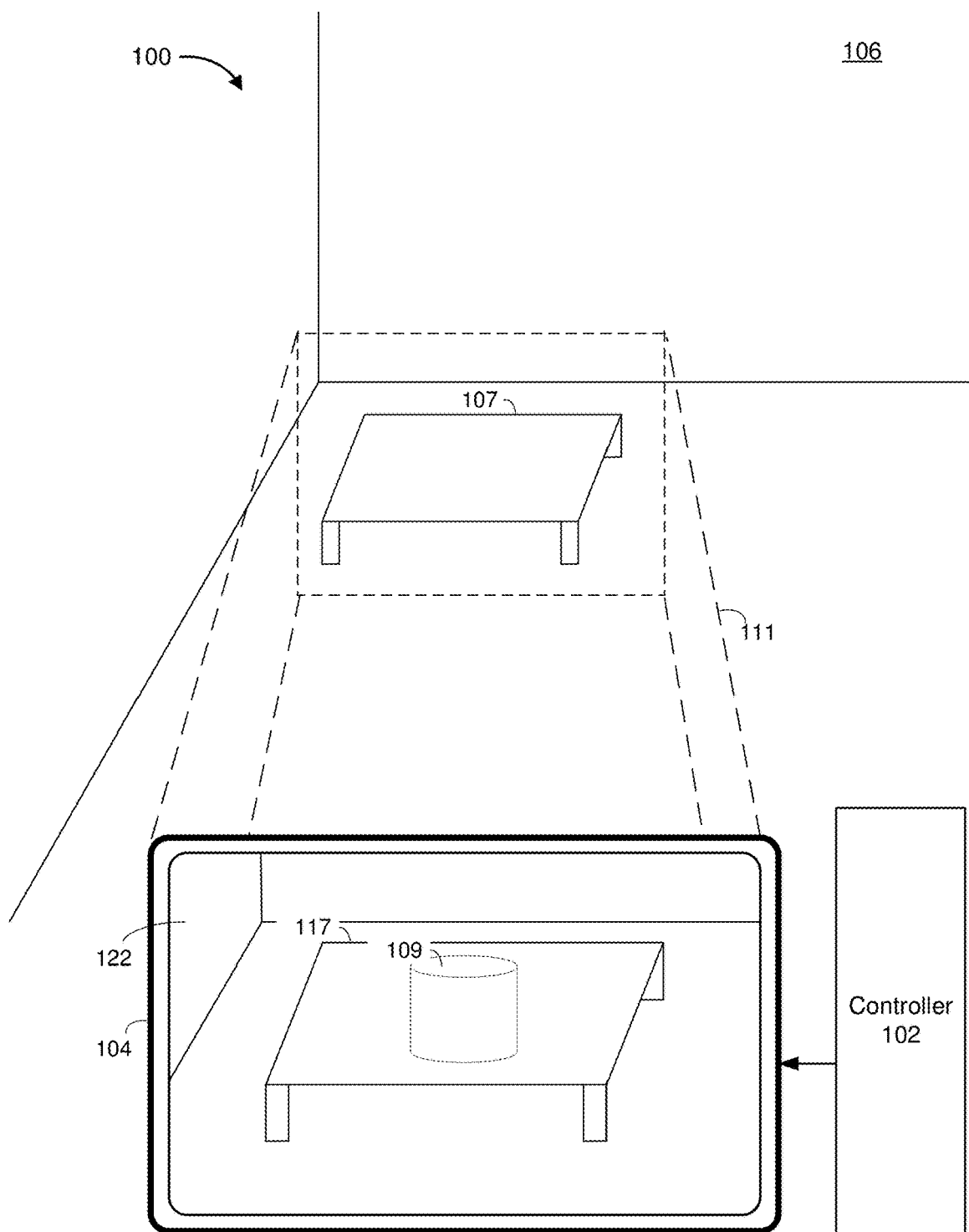
FIG. 1 is a block diagram of an exemplary operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for accessing shared data among processes. In various implementations, the method is performed at a device including one or more processors, non-transitory memory, and an image acquisition interface. The method includes obtaining image data associated with a field of view acquired by the image acquisition interface. The method further includes determining pose data based at least in part on inertial measurement unit (IMU) information, where the pose data corresponds to a current posture of the user measured by the image acquisition interface. The method additionally includes determining a gaze estimation based at least in part on eye tracking information obtained through the image acquisition interface. The method further also includes determining an arrangement for the image data, the pose data, and the gaze estimation based at least in part on a plurality of characteristics of a plurality of processes communicable with the image acquisition interface. The method further includes determining an access schedule for the plurality of processes based at least in part on at least one of: the arrangement for the image data, the pose data, and the gaze estimation, the plurality of characteristics of the plurality of processes, and hardware timing parameters associated with the device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes:

one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

As described above, processes on CGR devices following an interrupt model for resources often content for resources simultaneously. As a result, the bottleneck effect may cause latency that adversely affect the user's experience. Various implementations disclosed herein move away from the interrupt model towards a deterministic pull/fetch model. An access schedule is determined that allows the processes to fetch data at set times. The access schedule is determined based on known (e.g., deterministic) information, such as system parameters and user pose information. Accordingly, various implementations described herein address the above mentioned shortfalls, specifically those involved in data access. As a result, fewer memory and processing resources are consumed. It naturally follows that because latencies are decreased when data are through the CGR display pipeline, the overall user experience can be improved.

FIG. 1 is a block diagram of an exemplary operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and a CGR device 104.

In some implementations, the CGR device 104 corresponds to tablet or mobile phone. In various implementations, the CGR device 104 corresponds to a head-mounted system, such as a head-mounted device (HMD) or a head-mounted enclosure (HME) having a tablet or mobile phone inserted therein. In some implementations, the CGR device 104 is configured to present CGR content to a user. In some implementations, the CGR device 104 includes a suitable combination of software, firmware, and/or hardware.

According to some implementations, the CGR device 104 presents, via a display 122, CGR content to the user while the user is virtually and/or physically present within a scene 106 that includes a table 107 within the field-of-view 111 of the CGR device 104. In some implementations, the CGR device 104 is configured to present virtual content (e.g., the virtual cylinder 109) and to enable video pass-through of the scene 106 (e.g., including a representation 117 of the table 107) on a display 122. In some implementations, the CGR device 104 is configured to present virtual content and to enable optical see-through of the scene 106.

In some implementations, the user holds the CGR device 104 in his/her hand(s). In some implementations, the user wears the CGR device 104 on his/her head. As such, the CGR device 104 includes one or more CGR displays provided to display the CGR content. For example, the CGR device 104 encloses the field-of-view of the user. In some implementations, the CGR device 104 is replaced with a CGR chamber, enclosure, or room configured to present CGR content in which the user does not wear the CGR device 104.

In some implementations, the controller 102 is configured to manage and coordinate presentation of CGR content for the user. In some implementations, the controller 102 includes a suitable combination of software, firmware, and/or hardware. In some implementations, the controller 102 is a computing device that is local or remote relative to the scene 106. For example, the controller 102 is a local server located within the scene 106. In another example, the controller 102 is a remote server located outside of the scene 106 (e.g., a cloud server, central server, etc.). In some implementations, the controller 102 is communicatively coupled with the CGR device 104 via one or more wired or wireless communication channels 144 (e.g., BLUETOOTH, IEEE 802.11x, IEEE 802.16x, IEEE 802.3x, etc.). In some implementations, the functionalities of the controller 102 are provided by and/or combined with the CGR device 104.

As illustrated in FIG. 1, the CGR device 104 presents a representation of the scene 106. In some implementations, the representation of the scene 106 is generated by the controller 102 and/or the CGR device 104. In some implementations, the representation of the scene 106 includes a virtual scene that is a simulated replacement of the scene 106. In other words, in some implementations, the representation of the scene 106 is simulated by the controller 102 and/or the CGR device 104. In such implementations, the representation of the scene 106 is different from the scene 106 where the CGR device 104 is located. In some implementations, the representation of the scene 106 includes an augmented scene that is a modified version of the scene 106 (e.g., including the virtual cylinder 109). For example, in some implementations, the controller 102 and/or the CGR device 104 modify (e.g., augment) an image of the scene 106 in order to generate the representation of the scene 106. In some implementations, the controller 102 and/or the CGR device 104 generate the representation of the scene 106 by simulating a replica of the scene 106. In some implementations, the controller 102 and/or the CGR device 104 generate the representation of the scene 106 by removing and/or adding items from the simulated replica of the scene 106.

Figure 2:
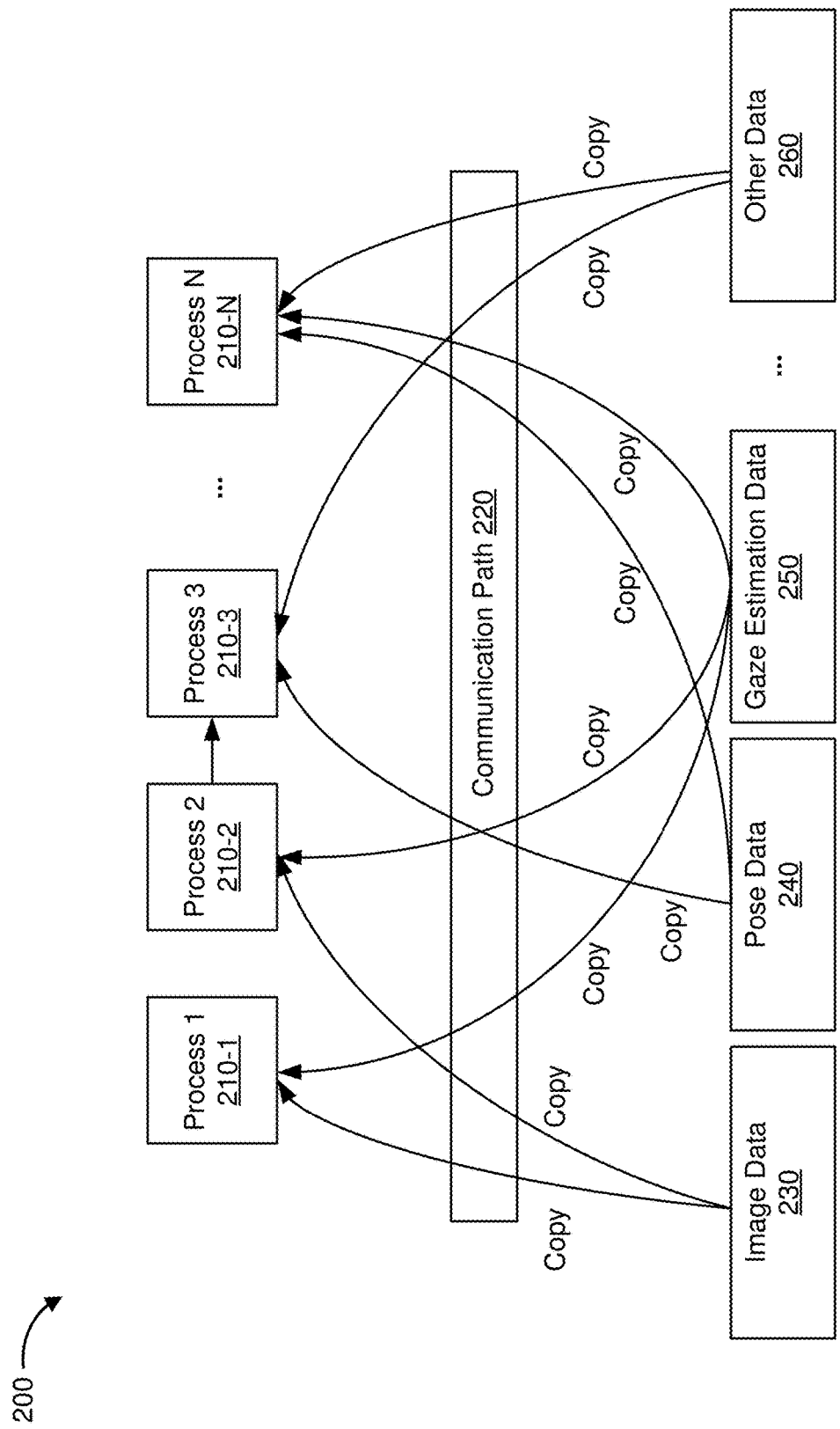
FIG. 2 is a block diagram illustrating an interrupt model for CGR data sharing in accordance with some implementations.

FIG. 2 is a block diagram illustrating an interrupt model 200 for CGR data sharing. In some implementations, in order to generate the representation of the scene 106 (as illustrated in FIG. 1), a plurality of processes, e.g., process 1 210-1, process 2 210-2, process 3 210-3 . . . process N 210-N, obtain raw data acquired by the CGR device 104 (as illustrated in FIG. 1) as inputs. For example, the raw data includes image data 230 acquired by image sensor(s), pose data 240 acquired by an IMU, gaze estimation data 250 derived from information obtained by an eye tracker, and other data 260 acquired by the CGR device 104. In some implementations, the plurality of processes 210 are dependent upon each other, such that outputs from one process are used by another process as inputs, e.g., outputs from process 2 210-2 are inputs to process 3 210-3. In some implementation, the raw data and/or the outputs from processes 210 are communicated through a communication path 220, e.g., a communication path established through communication interface(s) of the controller 102 and/or the communication interface(s) of the CGR device 104.

As shown in FIG. 2, when process 1 210-1 needs the image data 230 and the gaze estimation data 250, process 1

210-1 interrupts the image sensor and the eye tracker in order to obtain a copy of the image data 230 and a copy of the gaze estimation data 250 as inputs. Likewise, when process 2 210-2 also needs the image data 230 and the gaze estimation data 250, process 2 210-2 interrupts the image sensor and the eye tracker in order to obtain a copy of the image data 230 and a copy of the pose estimation data 250 as inputs. In another example, as shown in FIG. 2, process 3 210-3 needs inputs from process 2 210-2, the pose data 240, and the other data 260. Process 3 210-3 would wait for the completion of process 2 210-2 while interrupting the IMU and other sensor(s) in order to obtain the pose data 240 and the other data 260.

The interrupt model 200 is inefficient for several reasons. First, when multiple processes (e.g., process 1 210-1 and process 2 210-2) are contending for resources (e.g., the image data 230 and the gaze estimation data 250), the interrupts created multiple bottlenecks, e.g., at least one bottleneck at the sensors and another at the communication path 220. Second, because multiple copies of the data are created for multiple processes, the interrupt model 200 does not share memory across different tasks. As such, the memory usage is inefficient. Due to the bottlenecks, the inefficient memory utilization, and the cascade effect from process dependencies, the interrupt model 200 cannot meet the latency requirement for real-time streaming of CGR content. As such, the CGR scene presented using the interrupt model 200 can cause motion sickness for a user.

Figure 3:
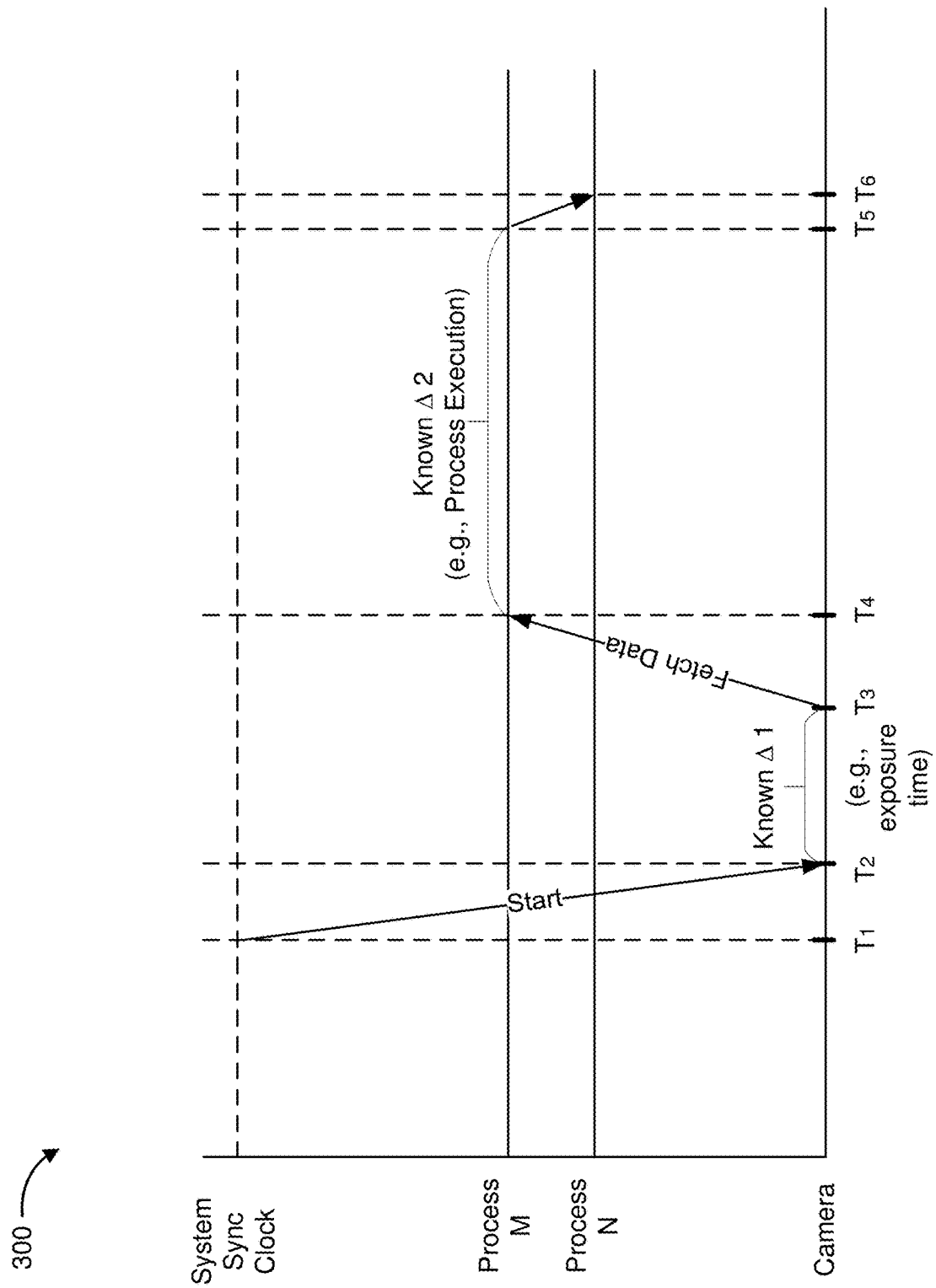
FIG. 3 is a block diagram of an exemplary deterministic pull/fetch model for CGR data sharing among processes in accordance with some implementations.

FIG. 3 is a block diagram of an example deterministic pull/fetch model 300 for CGR data sharing among processes in accordance with some embodiments. A deterministic system typically involves no randomness in the development of future states of the system. A deterministic model will thus produce the same output from a given starting condition or an initial state. As such, using the deterministic model 300, a system can predict when data from where would be produced and accessed. As such, the pull/fetch model 300 allows processes to retrieve data when the data are ready to be fetched and from a location efficient for the retrieval. Accordingly, in such system, bottlenecks are reduced and contention for resources goes down.

For example, FIG. 3 shows two processes, namely process M and process N, where process N depends on outputs from process M and process M fetches image data taken by a camera. The system learns hardware timing parameters, such as camera exposure time 41, as well as characteristics of the processes, e.g., processing time 42 for process M and/or the type of input data for processes M and N. These parameters and characteristics are used by the system to determine when a process would fetch data and from which location the data would be fetched. In FIG. 3, the system uses a system synchronization clock to measure the starting time (e.g., $T_1$), the expected camera operation duration (e.g., from $T_2$ to $T_3$), and the expected process M execution time (from $T_4$ to $T_5$) and calculates the wakeup time $T_4$ for process M and wakeup time $T_6$ for process N.

In some embodiments, the deterministic system generates an access schedule for the processes including the calculated wakeup time for each process. In some embodiments, between each task, a threshold amount of time is reserved, e.g., the periods between $T_1$ and $T_2$, between $T_3$ and $T_4$, and between $T_5$ and $T_6$. The threshold amount of time is reserved for communication latency between processes and/or hardware components, e.g., the time between $T_1$ and $T_2$ is for the system notifying the camera to start the image data acquisition, the time between $T_3$ and $T_4$ is for the camera waking up process M, and the time between $T_5$ and $T_6$ is for process M waking up process N. In some embodiments, the threshold amount of time is also recorded in the access schedule. Following the access schedule, upon waking up, the inputs for processes M and N are ready to be fetched. Thus, in contrast to the interrupt model 200 as shown in FIG. 2, the pull/fetch model 300 as shown in FIG. 3 reduces constraints at a system level and increases system performance as a whole.

Figure 4:
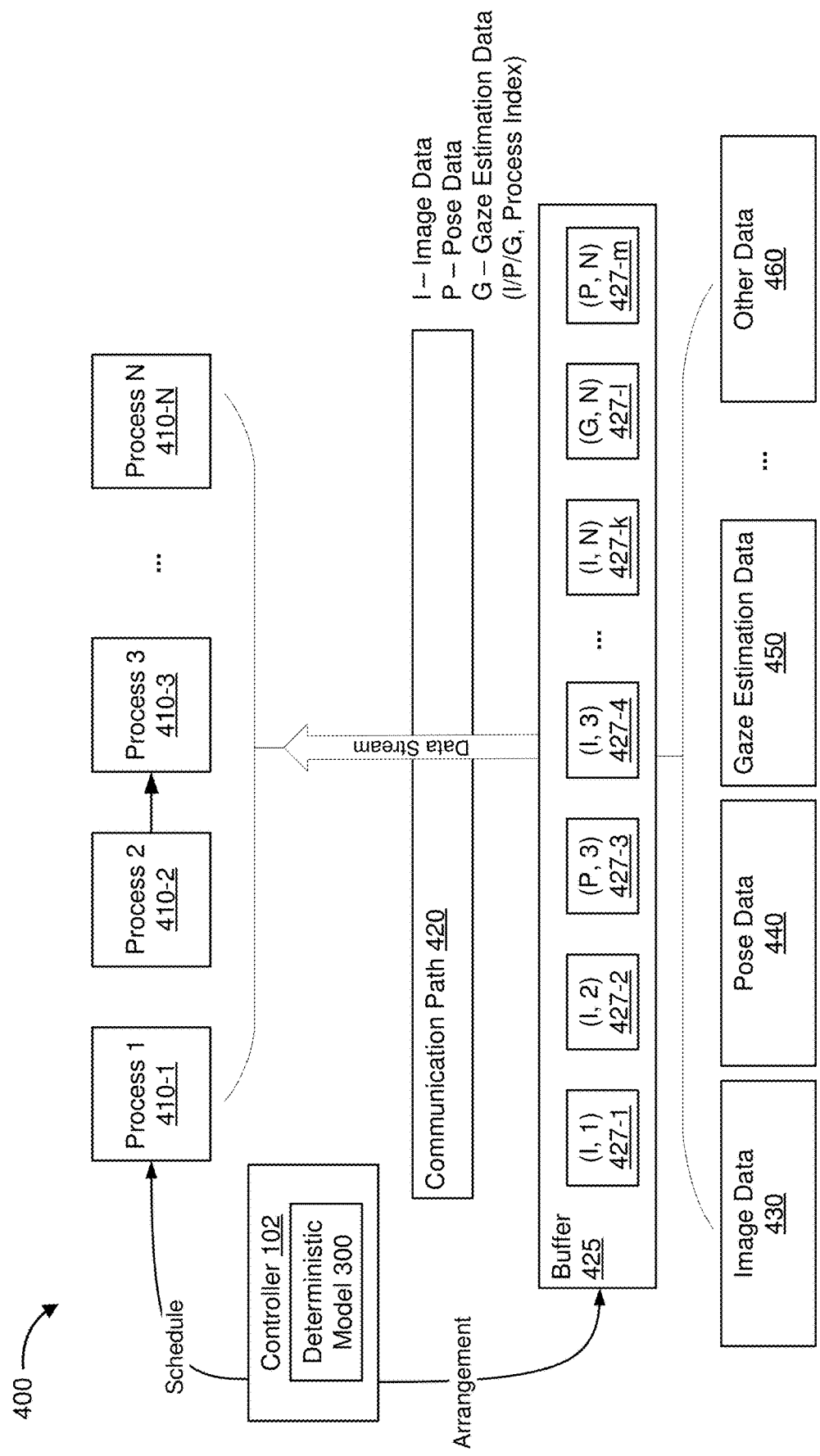
FIG. 4 is a block diagram illustrating an exemplary CGR data sharing process based on a deterministic pull/fetch model in accordance with some implementations.

FIG. 4 is a block diagram illustrating a CGR data sharing process 400 based on the deterministic pull/fetch model 300 in accordance with some implementations. In some implementations, in order to generate the representation of the scene 106 (as illustrated in FIG. 1), a plurality of processes, e.g., process 1 410-1, process 2 410-2, process 3 410-3 . . . process N 410-N, receive raw data acquired by the CGR device 104 (as illustrated in FIG. 1). For example, the raw data include image data 430 acquired by image sensor(s), pose data 440 acquired by an IMU, gaze estimation data 450 derived from information obtained by an eye tracker, and other data 460 acquired by the CGR device 104. In some implementations, the plurality of processes are dependent upon each other, such that outputs from one process are used by another process as inputs, e.g., outputs from process 2 410-2 are inputs to process 3 410-3. In some implementations, the raw data and/or the outputs from the plurality of processes 410 are communicated through a communication path 420, e.g., a communication path established through communication interface(s) of the controller 102 and/or the communication interface(s) of the CGR device 104.

As shown in FIG. 4, using the deterministic model 300, the controller 102 directs data arrangements (e.g., layout and/or sequencing) for data 427 in a buffer 425 and wakes up the plurality of processes 410 according to an access schedule, e.g., when the data in the buffer 425 are ready to be pulled/fetched. For example, the image data 427-2 for process 2 410-2 (represented as (I, 2) in FIG. 4) and the image data 427-4 for process 3 410-3 (represented as (I, 3) in FIG. 4) are obtained from the camera captured image data 430. The image data 427-2 for process 2 410-2 and the image data 427-4 for process 3 410-3 are arranged in the buffer 425 in a layout and/or sequence such that when the image data 427-2 and 427-4 are provided to the processes 410 in a data stream, and process 2 410-2 and process 3 410-3 wake up in sequence according to the access schedule. In particular, when process 3 410-3 wakes up, the image data 427-4 as well as the outputs from process 2 410-2 are ready to be pulled/fetched.

Figure 5A:
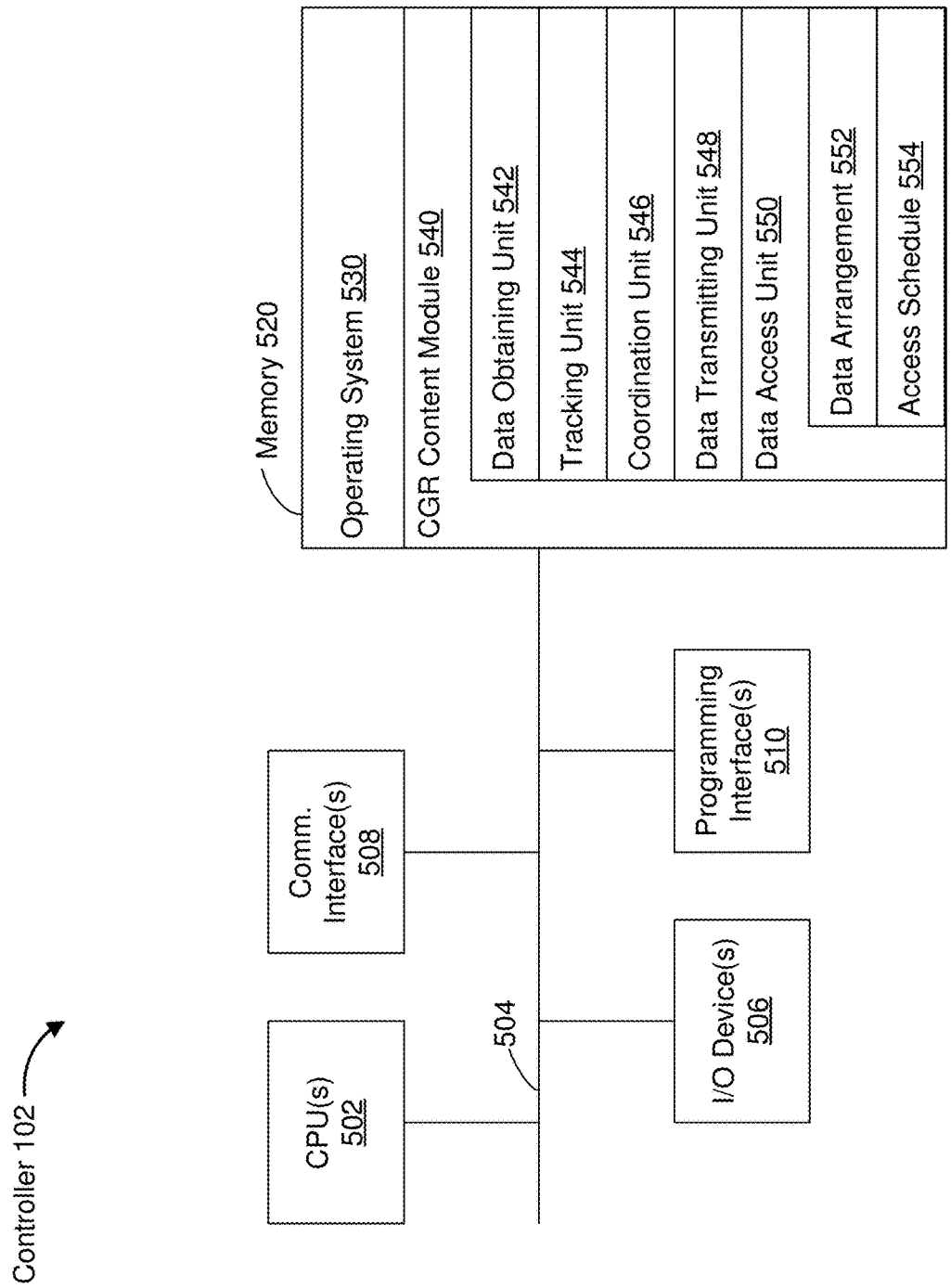
FIG. 5A is a block diagram of an example of a controller that is used in a pull/fetch model in accordance with some implementations.
Figure 5B:
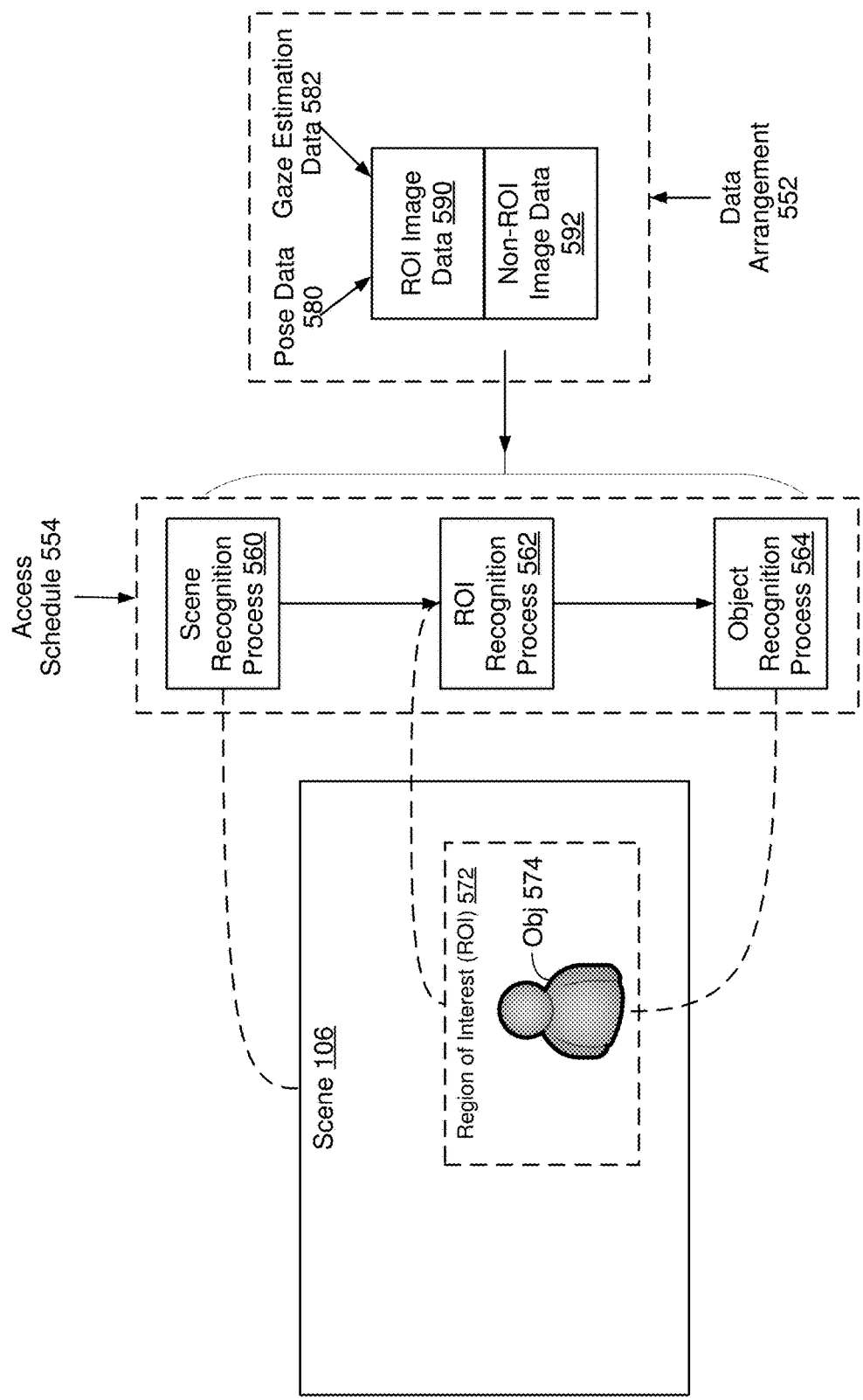
FIG. 5B is a block diagram illustrating an exemplary controller managed data arrangement and process access scheduling in accordance with some implementations.

FIG. 5A is a block diagram of an example of the controller 102 that is used in the pull/fetch model described above in accordance with some implementations. FIG. 5B is a block diagram illustrating the data arrangement and process access scheduling managed by the controller 102 in accordance with some implementations. FIG. 5B is used to illustrate an exemplary CGR scene generation managed by the controller 102 shown in FIG. 5A in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, as shown in FIG. 5A, in some implementations the controller 102 includes one or more processing units 502 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 506, one or more communication interfaces 508 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 510, a memory 520, and one or more communication buses 504 for interconnecting these and various other components.

In some implementations, the one or more communication buses 504 include circuitry that interconnects and controls communications between system components. In some implementations, the one or more I/O devices 506 include at least one of a keyboard, a mouse, a touchpad, a joystick, one or more microphones, one or more speakers, one or more image sensors, one or more displays, and/or the like.

The memory 520 includes high-speed random-access memory, such as dynamic random-access memory (DRAM), static random-access memory (SRAM), double-data-rate random-access memory (DDR RAM), or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530 and a CGR content module 540.

The operating system 530 includes procedures for handling various basic system services and for performing hardware dependent tasks. In some implementations, the CGR content module 540 is configured to manage and coordinate presentation of CGR content for one or more users (e.g., a single set of CGR content for one or more users, or multiple sets of CGR content for respective groups of one or more users). To that end, in various implementations, the CGR content module 540 includes a data obtaining unit 542, a tracking unit 544, a coordination unit 546, a data transmitting unit 548, and a data access unit 550.

In some implementations, the data obtaining unit 542 is configured to obtain data (e.g., image data, pose data, gaze estimation, presentation data, interaction data, sensor data, location data, etc.) from at least the CGR device 104. To that end, in various implementations, the data obtaining unit 542 includes instructions and/or logic therefor, and heuristics and metadata therefor.

In some implementations, the tracking unit 544 is configured to map the scene 106 and to track the position/location of at least the CGR device 104 with respect to the scene 106. To that end, in various implementations, the tracking unit 544 includes instructions and/or logic therefor, and heuristics and metadata therefor.

In some implementations, the coordination unit 546 is configured to manage and coordinate the presentation of CGR content to the user by the CGR device 104. In order to manage and coordinate the presentation of CGR content, in some implementations, the coordination unit 546 is configured to obtain information related to processes, data storage, and hardware characteristics. The information is then used by the coordination unit 546 to coordinate the processes at the system level. To that end, in various implementations, the coordination unit 546 includes instructions and/or logic therefor, and heuristics and metadata therefor.

In some implementations, the data transmitting unit 548 is configured to transmit data (e.g., presentation data, location data, etc.) to at least the CGR device 104. To that end, in various implementations, the data transmitting unit 548 includes instructions and/or logic therefor, and heuristics and metadata therefor.

In some implementations, the data access unit 550 is configured to determine an access schedule that allows processes to fetch data obtained from the data obtaining unit 542. In some implementations, the data access unit 550 determines a data arrangement 552 for efficient data retrieval by the processes. In some implementations, the data access unit 550 also determines an access schedule 554 for the processes to pull or fetch the data. To that end, in various implementations, the data transmitting unit 548 includes instructions and/or logic therefor, and heuristics and metadata therefor.

For example, in FIG. 5B, a scene recognition process 560 obtains image data and pose data 580 for recognizing the scene 106. As an eye tracker detects a user fixing gaze proximate to a region of interest (ROI) 572 within the scene 106, a ROI recognition process 562 identifies ROI image data 590 in the image data based on gaze estimation data 582. Subsequently, an object recognition process 564 analyzes the ROI image data 590 and recognizes an object 574 within the ROI 572. As shown in FIG. 5B, the processes 560, 562, and 564 access the data arrangement 552 according to the access schedule 554, where the access schedule 554 includes information such as a starting time for each process. Also as shown in FIG. 5B, data in the data arrangement 552 are arranged to accommodate the scheduled fetching. For instance, since the ROI image data 590 are used by the ROI recognition process 562 and the object recognition process 564, the ROI image data 590 is stored separately from non-ROI image data 592 to accommodate more frequent or more urgent access.

Referring back to FIG. 5A, although the data obtaining unit 542, the tracking unit 544, the coordination unit 546, the data transmitting unit 548, and the data access unit 550 are shown as residing on a single device (e.g., the controller 102), it should be understood that in other implementations, any combination of the data obtaining unit 542, the tracking unit 544, the coordination unit 546, the data transmitting unit 548, and the data access scheduling unit 550 may be located in separate computing devices.

Moreover, FIG. 5A is intended more as functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 5A could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 6:
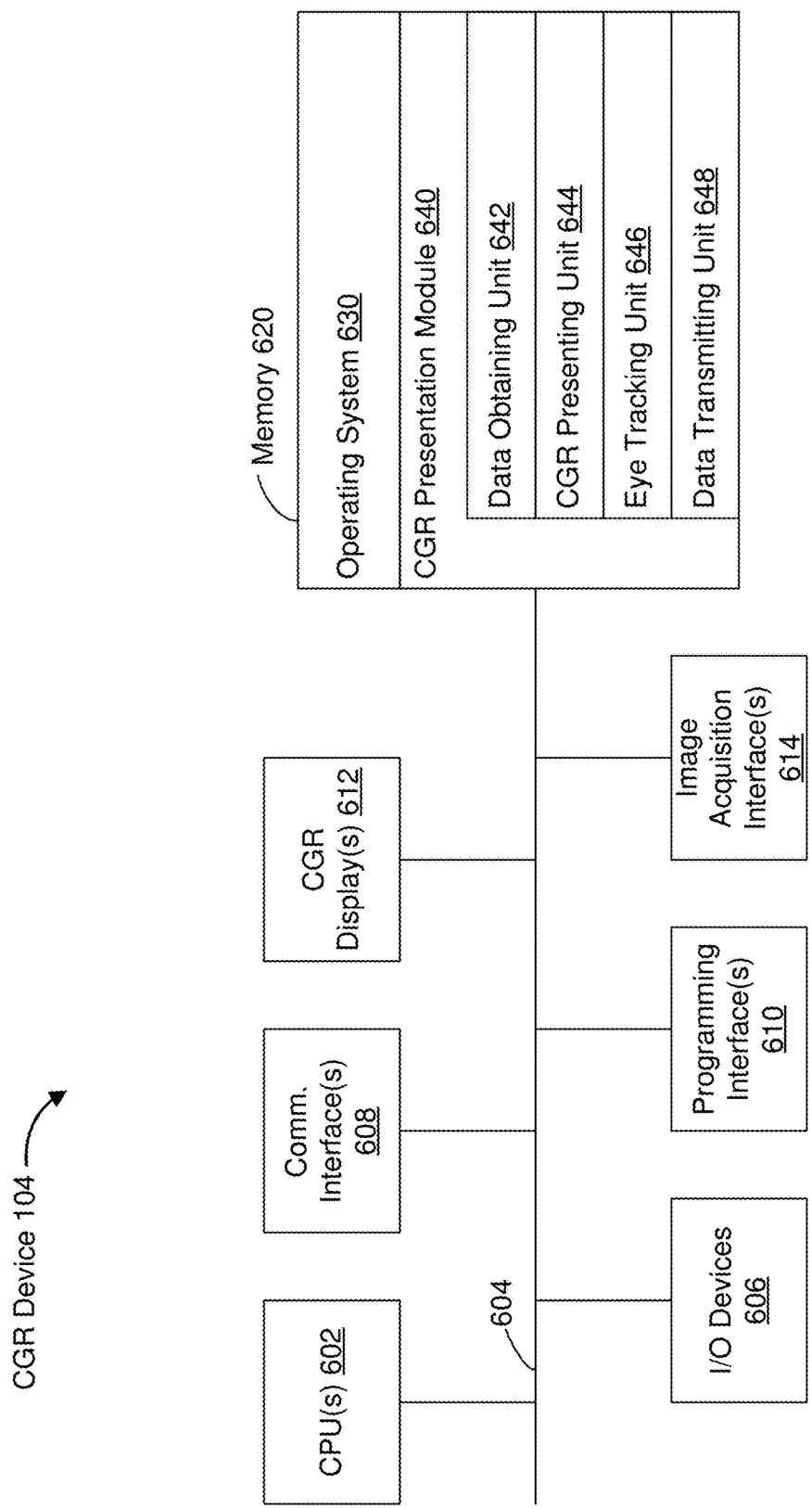
FIG. 6 is a block diagram of an exemplary CGR device in accordance with some implementations.

FIG. 6 is a block diagram of an exemplary CGR device 104 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the CGR device 104 includes one or more processing units 602 (e.g., microprocessors, ASICs, FPGAs, GPUs, CPUs, processing cores, and/or the like), one or more input/output (I/O) devices 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 610, one or more CGR displays 612, one or more image acquisition interfaces 614 (e.g., optional interior and/or exterior facing image sensors), a memory 620, and one or more communication buses 604 for interconnecting these and various other components.

In some implementations, the one or more communication buses 604 include circuitry that interconnects and controls communications between system components. In some implementations, the one or more I/O devices 606 include at least one of one or more physiological sensors (e.g., blood pressure monitor, heart rate monitor, blood oxygen sensor, blood glucose sensor, etc.), one or more microphones, one or more speakers, a haptics engine, and/or the like.

In some implementations, the one or more CGR displays 612 are configured to present CGR content to the user. In some embodiments, the one or more CGR displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 612 correspond to diffractive, reflective, polarized, holographic, etc. waveguide displays. For example, the CGR device 104 includes a single AR/VR display. In another example, the CGR device 104 includes an CGR display for each eye of the user.

In some implementations, the one or more image acquisition interfaces 614 are configured to obtain data for CGR content generation. In some implementations, the one or more image acquisition interfaces 614 include at least one of one or more image sensors, an inertial measurement unit (IMU), an accelerometer, a gyroscope, a thermometer, one or more depth sensors (e.g., a structured light, a time-of-flight, or the like), an eye tracker. For example, the one or more image sensors correspond to one or more RGB camera (e.g., with a complimentary metal-oxide-semiconductor (CMOS) image sensor or a charge-coupled device (CCD) image sensor), IR camera, event-based camera, and/or the like.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores the following programs, modules and data structures, or a subset thereof including an optional operating system 630 and a CGR presentation module 640.

The operating system 630 includes procedures for handling various basic system services and for performing hardware dependent tasks. In some implementations, the CGR presentation module 640 is configured to present CGR content to the user via the one or more CGR displays 612. To that end, in various implementations, the CGR presentation module 640 includes a data obtaining unit 642, a CGR presenting unit 644, an eye tracking unit 646, and a data transmitting unit 648.

In some implementations, the data obtaining unit 642 is configured to obtain data (e.g., image data, pose data, presentation data, interaction data, sensor data, location data, etc.) from at least the controller 102. To that end, in various implementations, the data obtaining unit 642 includes instructions and/or logic therefor, and heuristics and metadata therefor.

In some implementations, the CGR presenting unit 644 is configured to present CGR content via the one or more CGR displays 612. To that end, in various implementations, the CGR presenting unit 644 includes instructions and/or logic therefor, and heuristics and metadata therefor. In some implementations, the CGR presenting unit 644 is configured to project an image comprising emitted light in a first wavelength range through an eyepiece that distorts light in the first wavelength range. In some embodiments, the CGR presenting unit 644 is configured to project an image comprising emitted light in a first wavelength through an eyepiece that reflects and refracts light in the first wavelength range while passing, without substantial distortion, light in the second wavelength range.

In some implementations, the eye tracking unit 646 is configured to emit, using one or more light sources disposed between the eyepiece and the display, light in a second wavelength range and detect, using a camera, the light in the second wavelength range. In various implementations, the one or more light sources illuminate the eye of a user and the camera detect light reflected from the eye of the user. To that end, in various implementations, the eye tracking unit 646 includes instructions and/or logic therefor, and heuristics and metadata therefor. In some implementations, the eye tracking unit 646 is configured to emitting light in a second wavelength range through the eyepiece and detecting the light in the second wavelength range reflected by the eye of a user. In some implementations, the eye tracking unit 646 provides a gaze estimation based at least in part on the detected light reflection from the eye of the user.

In some implementations, the data transmitting unit 648 is configured to transmit data (e.g., presentation data, location data, etc.) to at least the controller 102. To that end, in various implementations, the data transmitting unit 648 includes instructions and/or logic therefor, and heuristics and metadata therefor.

Although the data obtaining unit 642, the CGR presenting unit 644, the eye tracking unit 646, and the data transmitting unit 648 are shown as residing on a single device (e.g., the CGR device 104), it should be understood that in other implementations, any combination of the data obtaining unit 642, the CGR presenting unit 644, the eye tracking unit 646, and the data transmitting unit 648 may be located in separate computing devices.

Moreover, FIG. 6 is intended more as functional description of the various features which are present in a particular embodiment as opposed to a structural schematic of the implementations described herein. As recognized by those of ordinary skill in the art, items shown separately could be combined and some items could be separated. In some implementations, some functional modules shown separately in FIG. 6 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 7A:
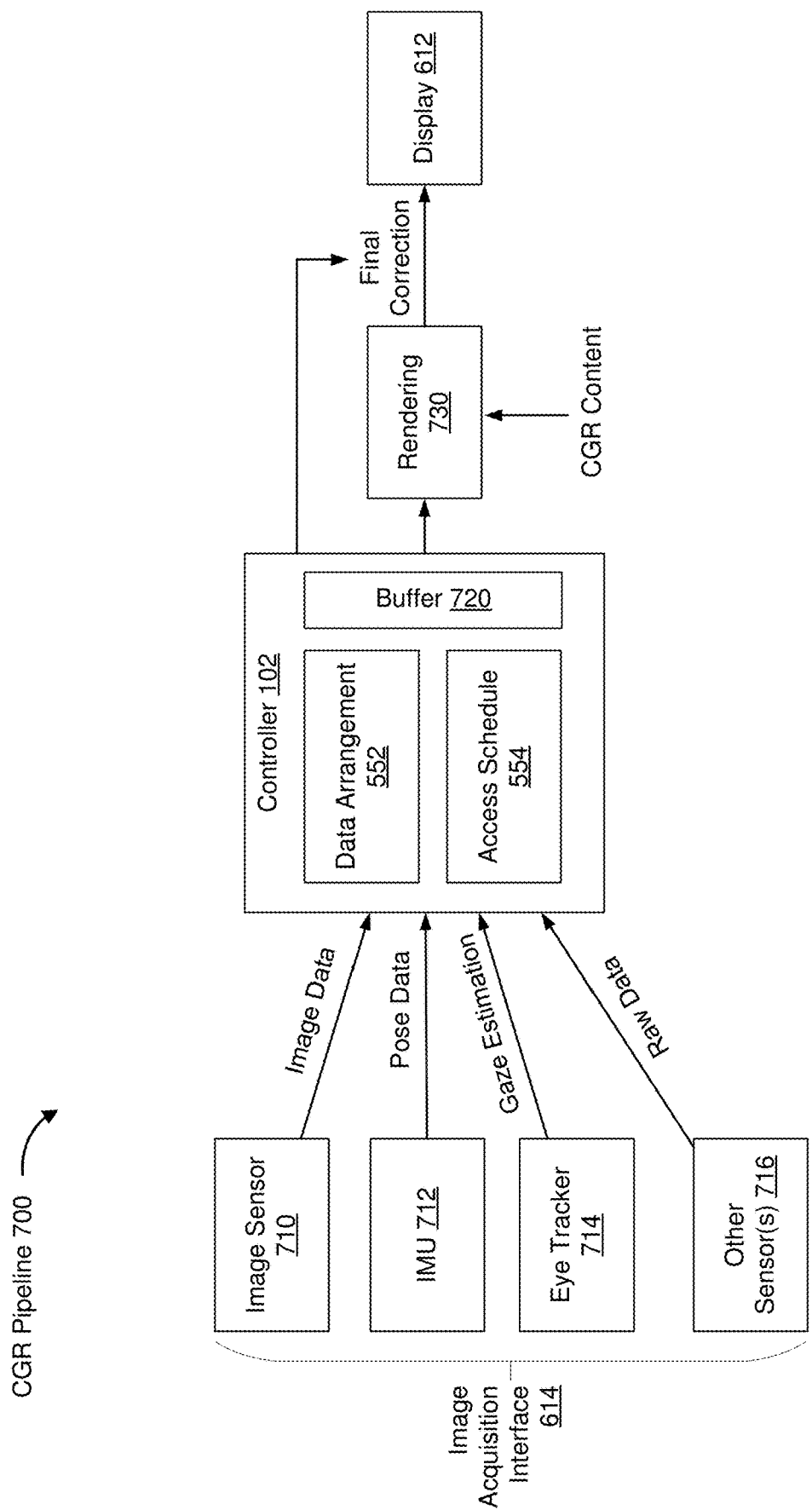
FIG. 7A illustrates a CGR pipeline in accordance with some implementations.
Figure 7B:
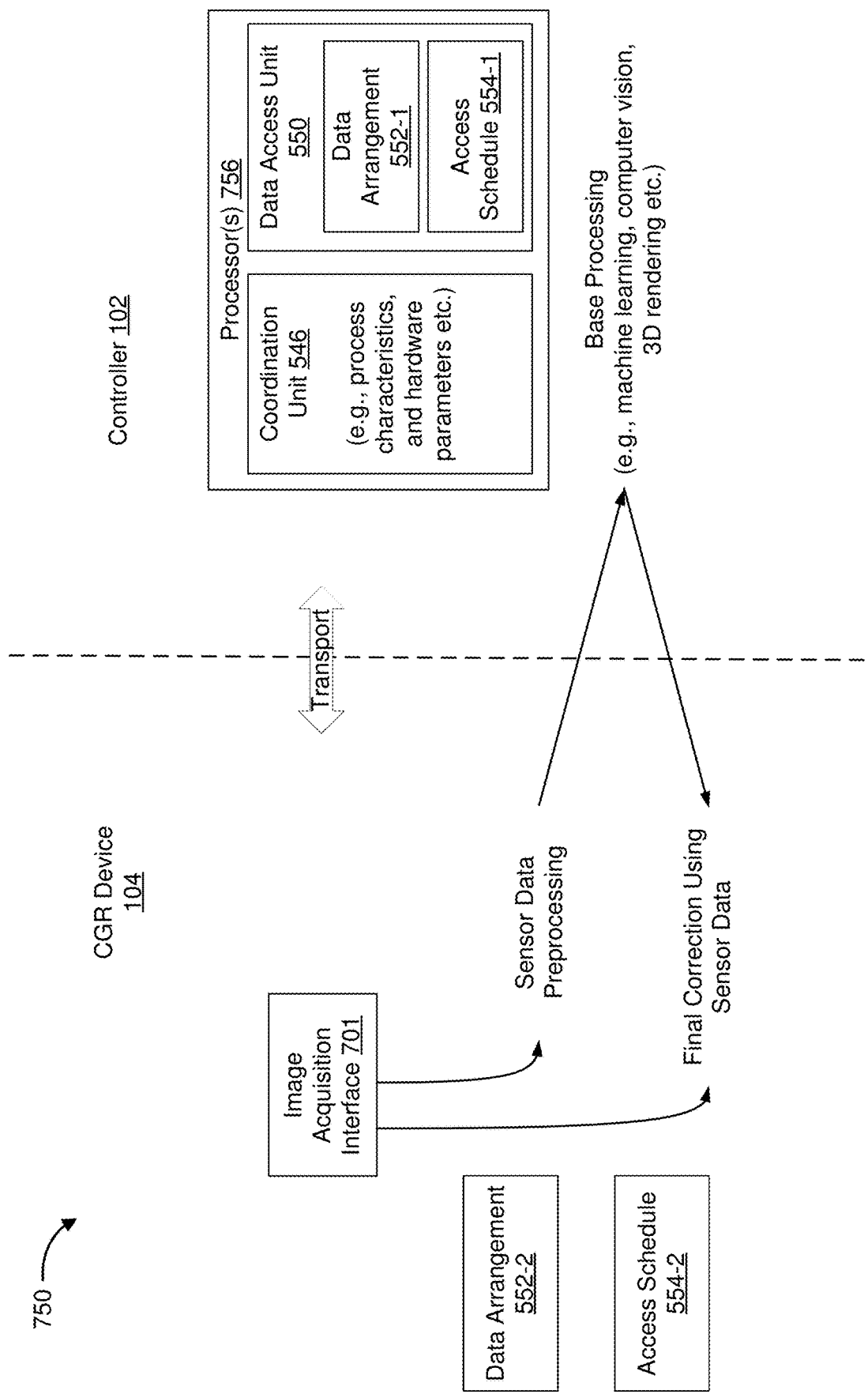
FIG. 7B illustrates a distributed system implementing the CGR pipeline in accordance with some implementations.

Additionally, in some implementations, the functions performed by the controller 102 as shown in FIG. 5A and the CGR device 104 as shown in FIG. 6 are distributed among devices. For example, FIG. 7A illustrates a CGR pipeline 700 that receives data from sensors and generates the representation of the scene 106 (as illustrated in FIG. 1) in accordance with some implementations. FIG. 7B illustrates a system 750 that implements the CGR pipeline 700. The system 750 distributes tasks performed by the controller 102 and/or the CGR device 104 described above between the controller 102 and the CGR device 104.

As shown in FIG. 7A, in some implementations, the image acquisition interface 614 (FIG. 6) includes at least an image sensor 710 for outputting image data, an IMU 712 for outputting pose data, an eye tracker 714 for providing gaze estimation, and one or more other sensors 716 for providing raw data as inputs to processes in order to generate the scene 106. Upon receiving the image data, pose data, gaze estimation data, and raw data, processes executed by the controller 102 stores the received data in a buffer (e.g., the buffer 425 in FIG. 4 or the buffer 720 in FIG. 7A) according to the data arrangement 552 as explained above. Further, the processes executed by the controller 102 accesses the buffer 720 according to the access schedule 554. The access schedule 554 is generated according to the deterministic model as described above with reference to FIG. 3.

In some implementations, the CGR pipeline 700 includes a rendering module 730 that receives CGR content and the data from the buffer 720 and renders an image on the display 612. In various implementations, the CGR content includes definitions of geometric shapes of virtual objects, colors and/or textures of virtual objects, images (such as a see-through image of the scene 106), and other information describing content to be represented in the rendered image. In some implementations, final correction is performed prior to displaying the rendered image. For example, based on the pose data, the rendered image is corrected to improve the user's experience.

In some implementations, the final correction and other less computationally-intensive tasks (e.g., sensor data preprocessing) are performed at the CGR device, as shown in FIG. 7B. The system 750 in FIG. 7B, which implements the CGR pipeline 700 according to some embodiments, distributes the functions performed by the controller 102 and/or the CGR device 104. As such, more computationally-intensive tasks are performed at the controller 102, e.g., using one or more processors 756 of the controller 102 for tasks such as machine learning, computer vision, and/or 3D rendering etc. The controller 102 then transports a computed image to the CGR device 104 for final correction before display. In some implementations, the transportation process includes compression/decompression and communications between the controller 102 and the CGR device 104.

In some implementations, the one or more processors 756 includes the coordination unit 546 and the data access unit 550, which further includes the data arrangement 552-1 and the access schedule 554-1 for processes distributed across the system 750. For example, the controller 102 collects characteristics of processes and hardware parameters from the CGR device 104. Using machine learning such as neural networks, characteristics of processes across platforms, including the transportation process, the sensor data preprocessing, and/or the final correction etc., can be extracted and weights are assigned, so that a sequencing of the processes accessing data can be predicted. The controller 102 can also determines the data arrangement 552-1 to accommodate the predicted data access based at least in part on the access schedule 554-1 in some implementations. Though FIG. 7B illustrates the system 750 comprising one controller 102 and one CGR device 104, in some embodiments, multiple CGR devices can connect to the controller 102. In such embodiments, the machine learning on the controller 102 can be used to predict access schedule for cross-platform processes including processes across multiple CGR devices (e.g., in a multi-player CGR environment). In some implementations, the controller 102 distributes the system wide data arrangement 552-1 and access schedule 554-1, so that each CGR device obtains a copy or a subset of the data arrangement 552-1 and/or the access schedule 554-1 from the controller 102. According to a local copy of the data arrangement 552-2 and a local copy of the access schedule 554-2, data acquired by the image acquisition interface 614 are arranged and processes associated with the CGR device 104 access the arranged data according to the schedule. As such, different from other systems, where each process or each device may have been optimized for data access, the system 750 according to embodiments described herein provides platform agnostic scheduling for data access at system level, so that latency is reduced as a whole.

Figure 8:
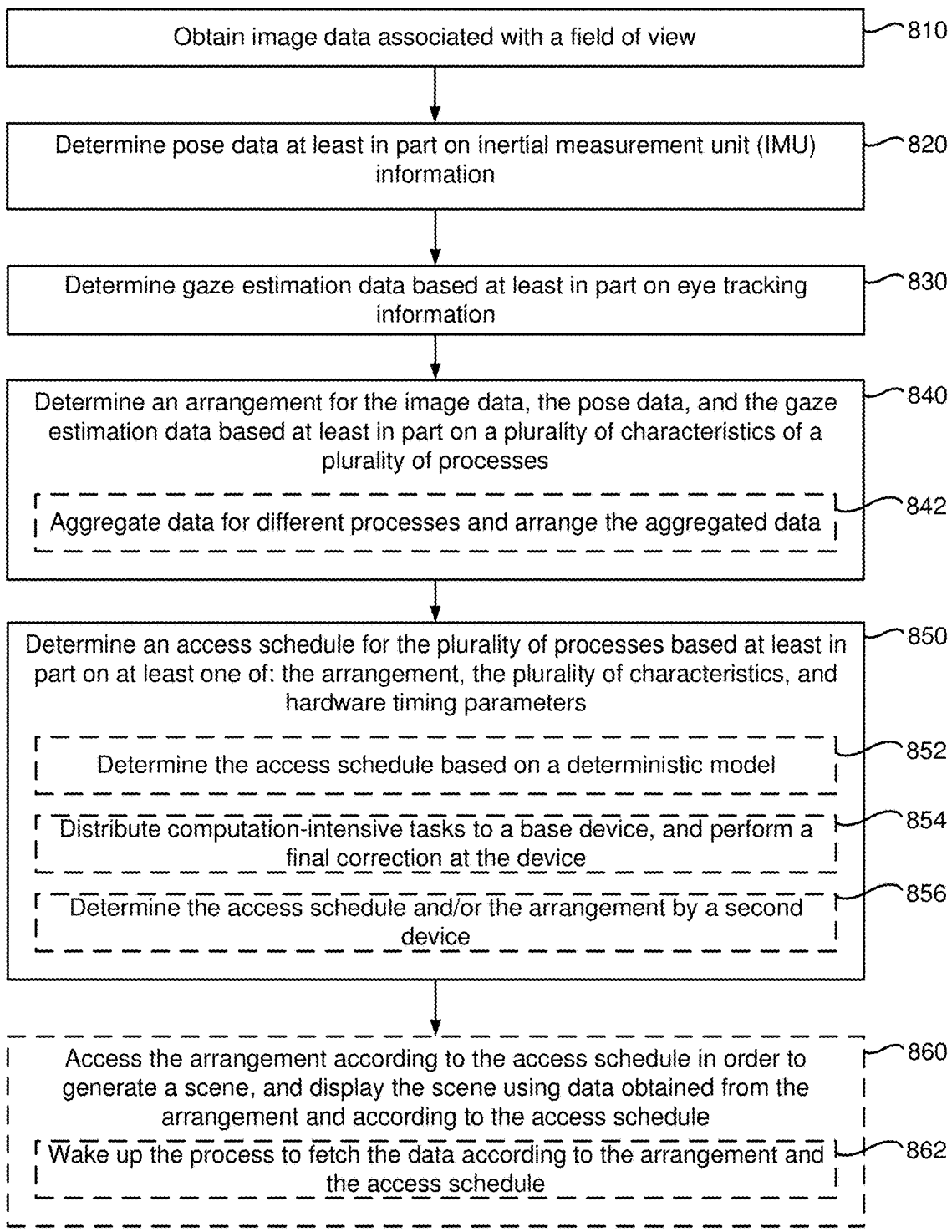
FIG. 8 is a flowchart representation of a method of accessing shared data among processes in accordance with some implementations.

FIG. 8 is a flowchart representation of a method 800 of determining an access schedule for processes in accordance with some implementations. In various implementations, the method 800 is performed by a device with one or more processors, non-transitory memory, and an image acquisition interface (e.g., the image acquisition interface 614 in FIG. 6). In some implementations, the method 800 is performed by processing logic, including hardware, firmware, software, or a combination thereof. In some implementations, the method 800 is performed by a processor and/or a controller (e.g., the controller 102 in FIG. 1) executing instructions (e.g., code) stored in a non-transitory computer-readable medium (e.g., a memory). Briefly, in some circumstances, the method 800 includes: utilizing the image acquisition interface to obtain image data, determine pose data, and determine a gaze estimation; determining an arrangement for the image data, the pose data, and the gaze estimation based at least in part on a plurality of characteristics of a plurality of processes communicable with the image acquisition interface; and determining an access schedule for the plurality of processes based at least in part on at least one of: the arrangement for the image data, the pose data, and the gaze estimation, the plurality of characteristics of the plurality of processes, and hardware timing parameters associated with the device.

The method 800 begins, in block 810, with the device obtaining image data associated with a field of view acquired by the image acquisition interface. In some embodiments, the image acquisition interface includes an image sensor (e.g., the image sensor 710 in FIG. 7A) for acquiring the image data associated with the field of view.

The method 800 continues, in block 820, with the device determining pose data based at least in part on inertial measurement unit (IMU) information, where the pose data corresponds to a current posture of the user measured by the image acquisition interface. In some embodiments, the image acquisition interface includes an IMU (e.g., the IMU 712 in FIG. 7A) for measuring the current posture of the user.

The method 800 continues, in block 830, with the device determining a gaze estimation based at least in part on eye tracking information obtained through the image acquisition interface. In some embodiments, the image acquisition interface includes an eye tracker (e.g., the eye tracker 714 in FIG. 7A) for obtaining the eye tracking information.

The method 800 continues, in block 840, with the device determining an arrangement for the image data, the pose data, and the gaze estimation based at least in part on a plurality of characteristics of a plurality of processes communicable with the image acquisition interface. For example, as shown in FIG. 4, the arrangement of the data 427 in the buffer 425 is determined by the controller 102 using the deterministic model 300. The deterministic model 300, as shown in FIG. 3, obtains characteristics (e.g., execution sequencing and/or process execution duration) of processes as part of the parameters for determining the arrangement of the data 427 in the buffer 425.

In some embodiments, as represented by block 842, the arrangement determination includes aggregating data for different processes and arranging the aggregated data based at least in part on the plurality of characteristics of the plurality of processes. For instance, the arrangement determination for two processes includes the steps of: (1) obtaining at least one of a first image data, a first pose data, and a first gaze estimation for a first process of the plurality of processes, where the first process is characterized by a first set of characteristics; (2) obtaining at least one of a second image data, a second pose data, and a second gaze estimation for a second process of the plurality of processes, wherein the second process is characterized by a second set of characteristics; and (3) aggregating the first image data, the first pose data, and the first gaze estimation with the second image data, the second pose data, and the second gaze estimation to generate the image data, the pose data, and the gaze estimation, wherein the image data, the pose data, and the gaze estimation are arranged based at least in part on the first set of characteristics and the second set of characteristics.

For example, as shown in FIG. 4, the arrangement of data 427 in the buffer 425 is determined based at least in part on the characteristics of the processes 410. In case the outputs from process 2 410-2 are used by process 3 410-3 as inputs, the data 427-2 for process 2 410-2 is arranged in the buffer such that it is ready to be fetched by process 2 410-2 before the data 427-4 is ready to be fetched by process 3 410-3. In another example, as shown in FIG. 5B, the ROI image data 590 is used by more processes than the non-ROI image data 592. As such, according to the data arrangement 552, the ROI image data 590 is stored at a more frequently access region and/or a region for more urgent needs.

Still referring to FIG. 8, the method 800 continues, in block 850, with the device determining an access schedule for the plurality of processes based at least in part on at least one of: the arrangement for the image data, the pose data, and the gaze estimation, the plurality of characteristics of the plurality of processes, and hardware timing parameters associated with the device. In some embodiments, as represented by block 852, the method 800 includes determining the access schedule based on a deterministic model. In such embodiments, the method 800 further includes determining, for a first process of the plurality of processes, inputs for the first process, at least one of a hardware or a second process providing the inputs, and a time parameter for obtaining the inputs from at least one of the hardware or the second process; and calculating a waking time for the first process based at least in part on the time parameter. For example, as shown in FIG. 3, for process M, the waking time for execution of process M is determined at least in part on the exposure time of the camera, e.g., known $\Delta 1$. For process N, the waking time for execution of process M is determined at least in part on the exposure time of the camera and the execution duration of process M, e.g., known $\Delta 1$ and known $\Delta 2$.

In some embodiments, as represented by block 854, the method 800 includes distributing computation-intensive tasks to a base device and performing a final correction at the device in order to optimize the user experience (e.g., reduce motion sickness). For example, in the CGR pipeline 700 as shown in FIG. 7A, the computation-intensive tasks including rendering (as performed by the rendering module 730) can be performed by the controller 102, as shown in FIG. 7B; while minimal computation such as sensor data preprocessing can be performed by the CGR device 104, as shown in FIG. 7B. Further as shown in FIG. 7A, prior to displaying the scene, data from the CGR device 104 (e.g., pose data) can be used for final correction. In some embodiments, the frames sent by the base for rendering are timestamped. Knowing the time when the frames are computed at the base, upon receiving the frames from the base, the CGR device predicts a rendering pose at a rendering time based on a trajectory of the pose data (e.g., corresponding to a current posture of the user as measured by the image acquisition interface). The CGR device then performs final correction by adjusting the frames using the rendering pose at the rendering time.

In some embodiments, as represented by block 856, the method 800 includes determining the access schedule and/or the arrangement by a second device. In particular, the distributed access schedule determination includes the steps of triggering collection of data by a base device, wherein the base device obtains at least one of the arrangement for the image data, the pose data, and the gaze estimation, the plurality of characteristics of the plurality of processes, and the hardware timing parameters from the device, and the data are also collected by the base device from other devices; and receiving the access schedule from the second device, wherein the access schedule is determined by the second device based on the data. For example, as shown in FIG. 7B, the controller 102 obtains processes characteristics, data arrangement information, and hardware parameters etc. from the CGR device 104. In some embodiments, the controller 102 also receives such information from other CGR devices. Utilizing the collected information, the controller 102 provides the system wide access schedule 554-1 and/or data arrangement 552-1.

In some embodiments, the method 800 continues, in block 860, with the device accessing the arrangement according to the access schedule in order to generate a scene for display (e.g., a CGR scene that is a representation of a real-world scene or a CGR scene that is a fully virtual scene); and displaying the scene using data obtained from the arrangement and according to the access schedule, where the data is a subset of at least one of the image data, the pose data, and the gaze estimation. For example, in FIG. 7A, the scene provided to the display 612 of the CGR device is generated using the data from the buffer 720. As shown in FIG. 4, the processes 410 for producing the scene pulls the data stream from the buffer 425 according to the access schedule, where data 427 in the buffer 425 are arranged according to the arrangement. In another example, as shown in FIG. 5B, the scene recognition process 560, the ROI recognition process 562, and the object recognition process 564 access data according to the access schedule 554, and the ROI image data 590 and the non-ROI image data 592 are stored according to the data arrangement 552.

In some embodiments, as represented by block 862, accessing the arrangement according to the access schedule includes determining an expected execution time for a process of the plurality of processes based on the access schedule and waking up the process for data access at the expected execution time upon fetching data used by the process according to the arrangement. For example, as shown in FIG. 3, based on the access schedule, the expected execution time for process M at time T4 is determined according to the access scheduled. At time T4, the image data from the camera are fetched by the process M from a buffer, in which data are arranged according to the system determined data arrangement.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device with one or more processors, a non-transitory memory, and an image acquisition interface:
obtaining image data associated with a field of view acquired by the image acquisition interface;
determining pose data based at least in part on inertial measurement unit (IMU) information, wherein the pose data corresponds to a current posture of a user measured by the image acquisition interface;
determining a gaze estimation based at least in part on eye tracking information obtained through the image acquisition interface;
determining an arrangement for the image data, the pose data, and the gaze estimation based at least in part on a plurality of characteristics of a plurality of processes communicable with the image acquisition interface; and
determining an access schedule for the plurality of processes based at least in part on at least one of:
the arrangement for the image data, the pose data, and the gaze estimation,
the plurality of characteristics of the plurality of processes, and
hardware timing parameters associated with the device;
wherein determining the arrangement for the image data, the pose data, and the gaze estimation based at least in part on the plurality of characteristics of the plurality of processes includes:
obtaining at least one of a first image data, a first pose data, and a first gaze estimation for a first process of the plurality of processes, wherein the first process is characterized by a first set of characteristics;
obtaining at least one of a second image data, a second pose data, and a second gaze estimation for a second process of the plurality of processes, wherein the second process is characterized by a second set of characteristics; and
aggregating the first image data, the first pose data, and the first gaze estimation with the second image data, the second pose data, and the second gaze estimation to generate the image data, the pose data, and the gaze estimation, wherein the image data, the pose data, and the gaze estimation are arranged based at least in part on the first set of characteristics and the second set of characteristics.

2. The method of claim 1, wherein the access schedule is determined based on a deterministic model, and the method includes:
determining, for a first process of the plurality of processes, inputs for the first process, at least one of a hardware or a second process providing the inputs, and a time parameter for obtaining the inputs from at least one of the hardware or the second process; and calculating a waking time for the first process based at least in part on the time parameter.

3. The method of claim 1, further comprising:

obtaining, from a base device, frames for rendering, wherein the frames are associated with timestamps;

predicting a rendering pose at a rendering time based on a trajectory of the pose data and the timestamps; and adjusting the frames using the rendering pose at the rendering time.

4. The method of claim 1, wherein determining the access schedule for the plurality of processes includes:

triggering collection of data by a base device, wherein the data includes at least one of the arrangement for the image data, the pose data, and the gaze estimation, the plurality of characteristics of the plurality of processes, or the hardware timing parameters associated with the device; and receiving the access schedule from the base device, wherein the access schedule is determined by the base device based on the data.

5. The method of claim 1, further comprising:

accessing the arrangement according to the access schedule in order to generate a scene for display; and displaying the scene using data obtained from the arrangement and according to the access schedule, wherein the data is a subset of at least one of the image data, the pose data, and the gaze estimation.

6. The method of claim 5, wherein accessing the arrangement according to the access schedule includes:

determining an expected execution time for a process of the plurality of processes based on the access schedule; and waking up the process for data access at the expected execution time upon fetching data used by the process according to the arrangement.

7. The method of claim 1, wherein the image data, the pose data, and the gaze estimation are stored in a storage device and the arrangement for the image data, the pose data, and the gaze estimation includes at least one of a layout or a sequencing for storing the image data, the pose data, and the gaze estimation in the storage device.

8. The method of claim 1, wherein the plurality of characteristics of the plurality of processes includes a sequence of the plurality of processes using the image data, the pose data, and the gaze estimation.

9. The method of claim 8, wherein the hardware timing parameters are associated with at least one of an image sensor, an IMU, an eye tracker, a controller, a processor, or a communication device.

10. A device comprising:

an image acquisition interface; and one or more processors to:

obtain image data associated with a field of view acquired by the image acquisition interface;

determine pose data based at least in part on inertial measurement unit (IMU) information, wherein the pose data corresponds to a current posture of a user measured by the image acquisition interface;

determine gaze estimation based at least in part on eye tracking information obtained through the image acquisition interface;

determine an arrangement for the image data, the pose data, and the gaze estimation based at least in part on a plurality of characteristics of a plurality of processes communicable with the image acquisition interface; and determine an access schedule for the plurality of processes based at least in part on at least one of:

the arrangement for the image data, the pose data, and the gaze estimation, the plurality of characteristics of the plurality of processes, and hardware timing parameters associated with the device;

wherein the one or more processors are to determine the arrangement for the image data, the pose data, and the gaze estimation based at least in part on the plurality of characteristics of the plurality of processes by:

obtaining at least one of a first image data, a first pose data, and a first gaze estimation for a first process of the plurality of processes, wherein the first process is characterized by a first set of characteristics;

obtaining at least one of a second image data, a second pose data, and a second gaze estimation for a second process of the plurality of processes, wherein the second process is characterized by a second set of characteristics; and aggregating the first image data, the first pose data, and the first gaze estimation with the second image data, the second pose data, and the second gaze estimation to generate the image data, the pose data, and the gaze estimation, wherein the image data, the pose data, and the gaze estimation are arranged based at least in part on the first set of characteristics and the second set of characteristics.

11. The device of claim 10, wherein the access schedule is determined based on a deterministic model, and one or more processors are further to:

determine, for a first process of the plurality of processes, inputs for the first process, at least one of a hardware or a second process providing the inputs, and a time parameter for obtaining the inputs from at least one of the hardware or the second process; and calculate a waking time for the first process based at least in part on the time parameter.

12. The device of claim 10, wherein the one or more processors are further to:

access the arrangement according to the access schedule in order to generate a scene for display; and display the scene using data obtained from the arrangement and according to the access schedule, wherein the data is a subset of at least one of the image data, the pose data, and the gaze estimation.

13. The device of claim 10, wherein the plurality of characteristics of the plurality of processes includes a sequence of the plurality of processes using the image data, the pose data, and the gaze estimation.

14. A method comprising:

at a device with one or more processors, a non-transitory memory, and an image acquisition interface:

obtaining image data associated with a field of view acquired by the image acquisition interface;

determining pose data based at least in part on inertial measurement unit (IMU) information, wherein the pose data corresponds to a current posture of a user measured by the image acquisition interface;

determining a gaze estimation based at least in part on eye tracking information obtained through the image acquisition interface;
determining an arrangement for the image data, the pose data, and the gaze estimation based at least in part on a plurality of characteristics of a plurality of processes communicable with the image acquisition interface; and
determining an access schedule for the plurality of processes based at least in part on at least one of:
the arrangement for the image data, the pose data, and the gaze estimation,
the plurality of characteristics of the plurality of processes, and
hardware timing parameters associated with the device;
wherein the access schedule is determined based on a deterministic model, and the method includes:
  determining, for a first process of the plurality of processes, inputs for the first process, at least one of a hardware or a second process providing the inputs, and a time parameter for obtaining the inputs from at least one of the hardware or the second process; and
  calculating a waking time for the first process based at least in part on the time parameter.

15. The method of claim 14, wherein determining the access schedule for the plurality of processes includes:
triggering collection of data by a base device, wherein the data includes at least one of the arrangement for the image data, the pose data, and the gaze estimation, the plurality of characteristics of the plurality of processes, or the hardware timing parameters associated with the device; and
receiving the access schedule from the base device, wherein the access schedule is determined by the base device based on the data.

16. The method of claim 14, further comprising:
accessing the arrangement according to the access schedule in order to generate a scene for display; and
displaying the scene using data obtained from the arrangement and according to the access schedule, wherein the data is a subset of at least one of the image data, the pose data, and the gaze estimation.

17. The method of claim 16, wherein accessing the arrangement according to the access schedule includes:
determining an expected execution time for a process of the plurality of processes based on the access schedule; and
waking up the process for data access at the expected execution time upon fetching data used by the process according to the arrangement.

18. A method comprising:
at a device with one or more processors, a non-transitory memory, and an image acquisition interface:
  obtaining image data associated with a field of view acquired by the image acquisition interface;
  determining pose data based at least in part on inertial measurement unit (IMU) information, wherein the pose data corresponds to a current posture of a user measured by the image acquisition interface;
  determining a gaze estimation based at least in part on eye tracking information obtained through the image acquisition interface;
  determining an arrangement for the image data, the pose data, and the gaze estimation based at least in part on a plurality of characteristics of a plurality of processes communicable with the image acquisition interface; and
  determining an access schedule for the plurality of processes based at least in part on at least one of:
  the arrangement for the image data, the pose data, and the gaze estimation,
  the plurality of characteristics of the plurality of processes, and
  hardware timing parameters associated with the device;
  wherein determining the access schedule for the plurality of processes includes:
    triggering collection of data by a base device, wherein the data includes at least one of the arrangement for the image data, the pose data, and the gaze estimation, the plurality of characteristics of the plurality of processes, or the hardware timing parameters from the device; and
    receiving the access schedule from the base device, wherein the access schedule is determined by the base device based on the data.

19. The method of claim 18, wherein the data are also collected by the base device from other devices.

20. The method of claim 18, further comprising:
obtaining, from the base device, frames for rendering, wherein the frames are associated with timestamps;
predicting a rendering pose at a rendering time based on a trajectory of the pose data and the timestamps; and
adjusting the frames using the rendering pose at the rendering time.

21. The method of claim 18, further comprising:
accessing the arrangement according to the access schedule in order to generate a scene for display; and
displaying the scene using data obtained from the arrangement and according to the access schedule, wherein the data is a subset of at least one of the image data, the pose data, and the gaze estimation,
wherein accessing the arrangement according to the access schedule includes:
  determining an expected execution time for a process of the plurality of processes based on the access schedule; and
  waking up the process for data access at the expected execution time upon fetching data used by the process according to the arrangement.

22. A device comprising:
an image acquisition interface; and
one or more processors to:
  obtain image data associated with a field of view acquired by the image acquisition interface;
  determine pose data based at least in part on inertial measurement unit (IMU) information, wherein the pose data corresponds to a current posture of a user measured by the image acquisition interface;
  determine gaze estimation based at least in part on eye tracking information obtained through the image acquisition interface;
  determine an arrangement for the image data, the pose data, and the gaze estimation based at least in part on a plurality of characteristics of a plurality of processes communicable with the image acquisition interface; and
  determine an access schedule for the plurality of processes based at least in part on at least one of:
  the arrangement for the image data, the pose data, and the gaze estimation, the plurality of characteristics of the plurality of processes, and hardware timing parameters associated with the device wherein the access schedule is determined based on a deterministic model, and one or more processors are further to:

determine, for a first process of the plurality of processes, inputs for the first process, at least one of a hardware or a second process providing the inputs, and a time parameter for obtaining the inputs from at least one of the hardware or the second process; and calculate a waking time for the first process based at least in part on the time parameter.

23. The device of claim 22, wherein the one or more processors are to determine the access schedule for the plurality of processes by:

triggering collection of data by a base device, wherein the data includes at least one of the arrangement for the image data, the pose data, and the gaze estimation, the plurality of characteristics of the plurality of processes, or the hardware timing parameters associated with the device; and receiving the access schedule from the base device, wherein the access schedule is determined by the base device based on the data.

24. The device of claim 22, wherein the one or more processors are further to:

access the arrangement according to the access schedule in order to generate a scene for display; and display the scene using data obtained from the arrangement and according to the access schedule, wherein the data is a subset of at least one of the image data, the pose data, and the gaze estimation.

25. The device of claim 24, wherein the one or more processors are to access the arrangement according to the access schedule by:

determining an expected execution time for a process of the plurality of processes based on the access schedule; and waking up the process for data access at the expected execution time upon fetching data used by the process according to the arrangement.

26. A device comprising:

an image acquisition interface; and one or more processors to:

obtain image data associated with a field of view acquired by the image acquisition interface;

determine pose data based at least in part on inertial measurement unit (IMU) information, wherein the pose data corresponds to a current posture of a user measured by the image acquisition interface;

determine gaze estimation based at least in part on eye tracking information obtained through the image acquisition interface;

determine an arrangement for the image data, the pose data, and the gaze estimation based at least in part on a plurality of characteristics of a plurality of processes communicable with the image acquisition interface; and determine an access schedule for the plurality of processes based at least in part on at least one of:

the arrangement for the image data, the pose data, and the gaze estimation, the plurality of characteristics of the plurality of processes, and hardware timing parameters associated with the device;

wherein the one or more processors are to determine the access schedule for the plurality of processes by:

triggering collection of data by a base device, wherein the data includes at least one of the arrangement for the image data, the pose data, and the gaze estimation, the plurality of characteristics of the plurality of processes, or the hardware timing parameters from the device; and receiving the access schedule from the base device, wherein the access schedule is determined by the base device based on the data.

27. The device of claim 26, wherein the data are also collected by the base device from other devices.

28. The device of claim 26, wherein the one or more processors are further to:

obtain, from the base device, frames for rendering, wherein the frames are associated with timestamps;

predict a rendering pose at a rendering time based on a trajectory of the pose data and the timestamps; and adjust the frames using the rendering pose at the rendering time.

29. The device of claim 26, wherein the one or more processors are further to:

access the arrangement according to the access schedule in order to generate a scene for display; and display the scene using data obtained from the arrangement and according to the access schedule, wherein the data is a subset of at least one of the image data, the pose data, and the gaze estimation.

30. The device of claim 29, wherein the one or more processors are to accessing the arrangement according to the access schedule by:

determining an expected execution time for a process of the plurality of processes based on the access schedule; and waking up the process for data access at the expected execution time upon fetching data used by the process according to the arrangement.

* * * * *